US010712771B2

(12) United States Patent
Chen et al.

(10) Patent No.: US 10,712,771 B2
(45) Date of Patent: Jul. 14, 2020

(54) SYSTEM AND METHOD FOR SYNCHRONIZED PLAYBACK OF STREAMING DIGITAL CONTENT

(75) Inventors: Eli Chen, San Mateo, CA (US); Greg Peters, San Francisco, CA (US)

(73) Assignee: NETFLIX, INC., Los Gatos, CA (US)

( * ) Notice: Subject to any disclaimer, the term of this patent is extended or adjusted under 35 U.S.C. 154(b) by 421 days.

(21) Appl. No.: 12/856,466

(22) Filed: Aug. 13, 2010

(65) Prior Publication Data

US 2012/0042047 A1 Feb. 16, 2012

(51) Int. Cl.
*G06F 1/12* (2006.01)
*H04N 21/43* (2011.01)
*H04N 21/254* (2011.01)
*H04N 21/6543* (2011.01)
*H04N 21/432* (2011.01)
*H04N 21/658* (2011.01)
*H04N 21/242* (2011.01)

(52) U.S. Cl.
CPC ............ *G06F 1/12* (2013.01); *H04N 21/242* (2013.01); *H04N 21/254* (2013.01); *H04N 21/4305* (2013.01); *H04N 21/4307* (2013.01); *H04N 21/4325* (2013.01); *H04N 21/6543* (2013.01); *H04N 21/6581* (2013.01)

(58) Field of Classification Search
CPC ........... H04N 21/2662; H04N 21/4305; H04N 21/242; H04N 21/4325; H04N 21/4307
USPC .......................................... 709/219; 715/203
See application file for complete search history.

(56) References Cited

U.S. PATENT DOCUMENTS

| 7,434,154 | B2 * | 10/2008 | Konetski ........................ 715/203 |
| 7,627,808 | B2 * | 12/2009 | Blank et al. ................... 715/200 |
| 8,321,534 | B1 * | 11/2012 | Roskind et al. ............... 709/220 |
| 2002/0046296 | A1 * | 4/2002 | Kloba et al. ................... 709/248 |
| 2002/0065926 | A1 * | 5/2002 | Hackney et al. ............. 709/231 |
| 2002/0099774 | A1 | 7/2002 | Yamato et al. |
| 2003/0204849 | A1 | 10/2003 | Watanabe |

(Continued)

FOREIGN PATENT DOCUMENTS

| CN | 1489356 A | 4/2004 |
| JP | 2002-218277 A | 8/2002 |

(Continued)

OTHER PUBLICATIONS

International Search Report of PCT/US 11/47483 dated Dec. 22, 2011.

(Continued)

*Primary Examiner* — Philip J Chea
*Assistant Examiner* — Robert B McAdams
(74) *Attorney, Agent, or Firm* — Artegis Law Group, LLP (57) ABSTRACT

One embodiment of the present invention sets forth a technique for synchronizing playback of digital content on two or more different content players. Each content player synchronizes a local time signal to a time reference signal maintained by a time server. Actions related to content playback are synchronized with respect to each local time signal for a given content player, which thereby synchronizes playback for a group of associated content players. Each content player may be advantageously configured with different playback options, allowing each user to have a better shared viewing experience than possible with prior art solutions that provide only one set of playback options.

22 Claims, 5 Drawing Sheets

(56) References Cited

U.S. PATENT DOCUMENTS

| | | | |
|---|---|---|---|
| 2004/0228367 A1* | 11/2004 | Mosig | 370/503 |
| 2006/0156375 A1* | 7/2006 | Konetski | 725/135 |
| 2007/0250761 A1* | 10/2007 | Bradley et al. | 715/500.1 |
| 2007/0266122 A1* | 11/2007 | Einarsson et al. | 709/220 |
| 2008/0137690 A1* | 6/2008 | Krantz et al. | 370/503 |
| 2008/0195744 A1 | 8/2008 | Bowra et al. | |
| 2008/0259966 A1* | 10/2008 | Baird et al. | 370/503 |
| 2008/0291863 A1 | 11/2008 | Agren | |
| 2009/0249222 A1* | 10/2009 | Schmidt | H04N 21/2368 715/751 |
| 2010/0100917 A1 | 4/2010 | Chiao et al. | |
| 2010/0111491 A1 | 5/2010 | Kamoto | |
| 2010/0142412 A1* | 6/2010 | Synnergren et al. | 370/261 |
| 2010/0161723 A1 | 6/2010 | Bryce et al. | |
| 2010/0205318 A1 | 8/2010 | Melnyk et al. | |

FOREIGN PATENT DOCUMENTS

| | | |
|---|---|---|
| JP | 2003319365 A | 7/2003 |
| JP | 2004-266576 A | 9/2004 |

OTHER PUBLICATIONS

NPL_Japan Patent Office, Office Action dated Apr. 1, 2014.

European Search Report dated Oct. 21, 2015 in Application No. 11 81 7062.

Fernando Boronat et al. "An RTP/RTCP based approach for multimedia group and inter-stream synchronization". Multimedia Tools and Applications, Kluwer Academic Publishers, vol. 40, No. 2, Jun. 25, 2008, pp. 285-319, ISSN: 1573-7721.

Boronat F et al: "Multimedia group and 1-15 inter-stream synchronization techniques: A comparative study". A Information Systems. Pergamon Press. Oxford. GB. vol. 34. No. 1. Mar. 1, 2009 (Mar. 1, 2009). pp. 108-131. XP025644936, ISSN: 0306-4379. DOI: 10.1016/J.IS.2008.05.001.

Oskar Van Deventer M et al: "Advanced 1.10.12 interactive television services require content synchronization". Systems. Signals and Image Processing. 2008. IWSSIP 2008. 15th International Conference On. IEEE. Piscataway. NJ. USA. Jun. 25, 2008 (Jun. 25, 2008). pp. 109-112. XP031310397. ISBN: 978-80-227-2856-0.

\* cited by examiner

SYSTEM AND METHOD FOR SYNCHRONIZED PLAYBACK OF STREAMING DIGITAL CONTENT

BACKGROUND OF THE INVENTION

Field of the Invention

Embodiments of the present invention relate generally to digital media and, more specifically, to a system and method for synchronized playback of streaming digital content.

Description of the Related Art

One popular model for consumer content delivery involves transmitting digital content files from a content server directly to a content player via a communications network. The content server is typically a computer system in a secure machine room configured to store digital content files that can be downloaded to the content player via the communications network. Each digital content file is associated with a specific identifying title, such as "Gone with the wind," which is likely to be familiar to a user. A given digital content file may be selected by the user and downloaded from the content server to the content player prior to or during playback.

The content player may be implemented as a computer application on a general-purpose platform or as a dedicated device configured to play digital content files. The digital content files may comprise digitally encoded songs and sound tracks, movies, television programs, and so forth. The content player typically downloads and stores at least a portion of the digital content file to facilitate uninterrupted playback of the title. For a given title, the user is typically given a choice of playback options. For example, the user may choose to watch a given title in a particular language, or with subtitles in a specified language.

Oftentimes, the title is played in a setting with two or users viewing the title simultaneously. For example, multiple users may want to watch a movie or television program together in a living room on a large-screen television. In many common scenarios, two of the users may wish to select conflicting viewing options. For example, one user may wish to watch a particular movie with subtitles turned on, while another user may not want their viewing experience cluttered with subtitles. As another example, one user may wish to watch a movie with a soundtrack that includes a director's commentary, while another user only wants to hear the normal sound track for the movie. In each case, at least one user has to sacrifice their viewing enjoyment for the benefit of another user because the users have conflicting viewing preferences.

As the foregoing illustrates, what is needed in the art is technique for enabling two or more users to share a viewing experience while still honoring the viewing preferences each of the users.

SUMMARY OF THE INVENTION

One embodiment of the present invention sets forth a method for playing a digital content title synchronously across multiple endpoint devices. The method includes the steps of synchronizing a local time signal to a time reference signal generated by a remote time server, transmitting a playback session identifier to a content server, where the playback session identifier is associated with a unique playback session for the digital content title, receiving a server side event that includes a playback command and a specified time for executing the playback command, and scheduling the playback command for execution at the specified time based on the local time signal.

Other embodiments include, without limitation, a computer-readable medium that includes instructions that enable a processing unit to implement one or more aspects of the disclosed methods as well as a system configured to implement one or more aspects of the disclosed methods.

One advantage of the disclosed systems and techniques is that a plurality of users is enabled to share a common viewing experience based on their individual viewing preferences. This is in contrast to prior art solutions that force all users to share one common set of viewing preferences.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
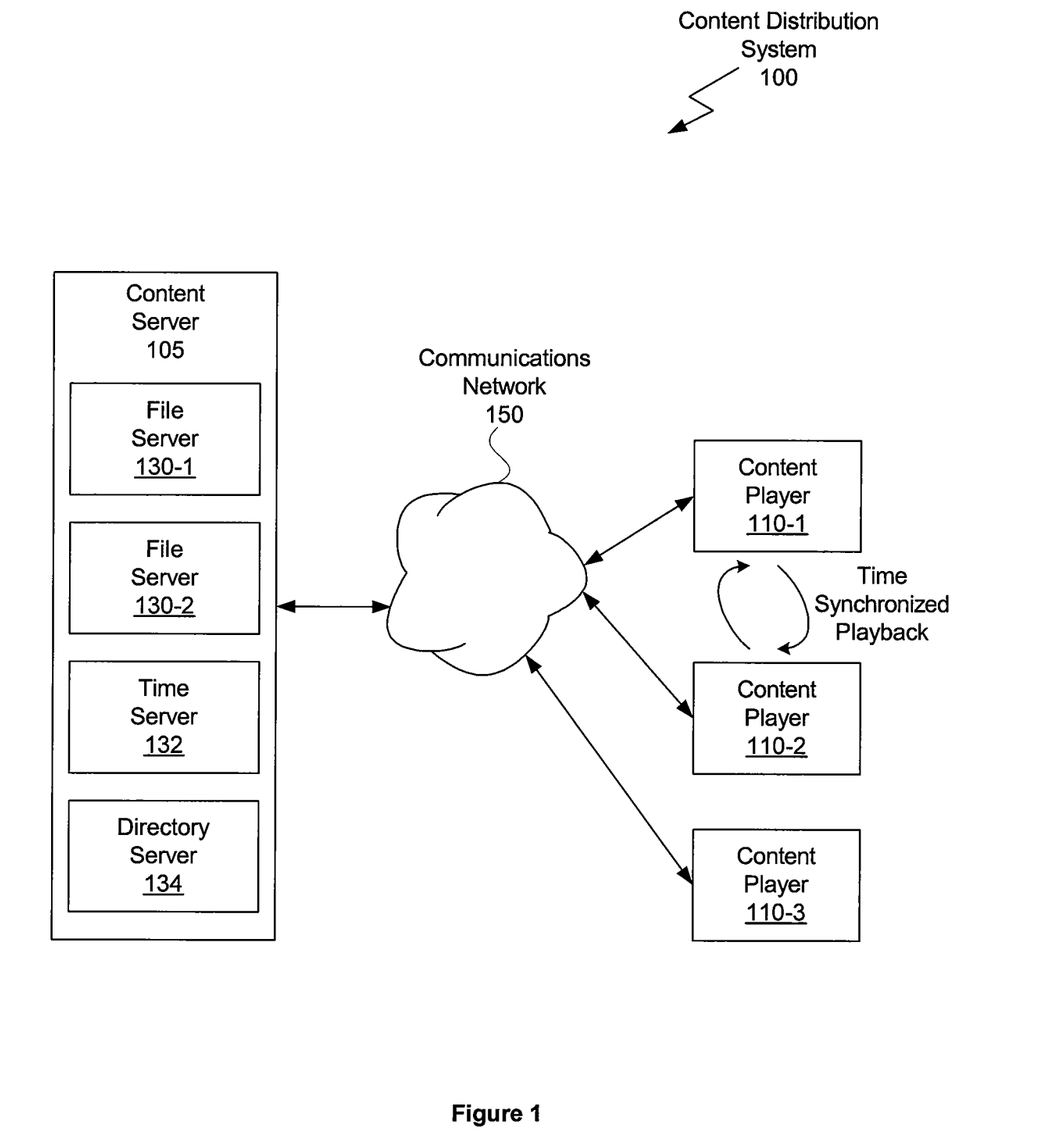
FIG. 1 illustrates a content distribution system configured to implement one or more aspects of the present invention.

FIG. 1 illustrates a content distribution system 100 configured to implement one or more aspects of the present invention. The content distribution system 100 includes a content server 105, a communications network 150, and content players 110. The content server 105 includes one or more content server systems, each implemented using a computer server. Each computer server may comprise a hardware computer system or a virtual computer system running on an arbitrary collection of one or more hardware computer systems. Each content server system may implement a file server 130, a time server 132, a directory server 134, or any combination thereof.

The communications network 150 may be implemented using any technically feasible system configured to transport digital data between the content server 105 and the content players 110. In one embodiment the communications network 150 substantially comprises a switching and routing network based on the industry standard internet protocol (IP). The popular "Internet" communications network is one example of a suitable IP-based communications network.

In one embodiment, the file servers 130, time server 132, and directory server 134 are implemented as applications running on independent computer systems coupled to the communications network 150. In an alternative embodiment, one or more of the file servers 130, time server 132, and directory server 134 are implemented as applications executing on a computer system coupled to the communications network 150. In both said embodiments, each one of the computer systems may be an independent hardware computer system or a virtual computer system hosted by an arbitrary hardware configuration including one or more independent hardware computer systems.

The file servers 130 are configured to store and retrieve digital content files for download to the content players 110. A plurality of file servers 130-1, 130-2, and so forth, may be employed to scale up total download bandwidth, for example, as a function of overall download demand. The directory server 134 implements any technically feasible mechanisms to enable a content player 110 to locate a particular title within a catalog of titles and to initiate download of one or more corresponding digital content files from one of the file servers 130. A particular title may have one or more associated digital content files, corresponding different encoding formats. For example, a particular title may have a plurality of associated digital content files containing video encoded in different resolutions and frame rates. As another example, a particular title may have a plurality of associated digital content files containing audio tracks dubbed in different languages.

The time server 132 is configured to generate a time reference signal, characterized by a monotonically increasing time value that represents uniformly quantized time steps of elapsed time. For example, the time reference signal may represent seconds and fractions of a second that have elapsed since a certain reference time. The time server 132 is configured to respond to time synchronization requests from the content players 110, enabling each one of the content players 110 to generate a local time signal that is synchronized to the time reference signal.

Persons skilled in the art will recognize that any technically feasible time synchronization protocol may be used between the time server 132 and the content players 110. One exemplary time synchronization protocol is the industry standard network time protocol (NTP), which is conventionally used to synchronize a local time signal in a client device to a time reference signal in one or more server devices via an intervening IP-based communications network.

The content players 110 implement a playback application for the digital content files available from the file servers 130. A given digital content file may include data for audio playback, video playback, or combined audio and video playback. Playback of video and audio content is synchronized via a local time signal. A digital content file may also include alternative content such as subtitles, video overlays, programmatically generated behavior, and the like. Playback of the alternative content is synchronized to the playback video and audio content via the local time signal.

Each content player 110 includes a time synchronization client configured to synchronize the local time signal to the time reference signal generated by the time server 132. Each playback application within a particular content player 110 receives a local time signal generated by a respective time synchronization client for the content player 110. Playback of each digital content file is synchronized according to the local time signal, for example, to synchronize video, audio, and subtitle playback.

As a consequence of content players 110 synchronizing their respective local time signals to the time server 132 time reference signal, the local time signals generated by the content players 110 are also synchronized to each other. Digital content playback can therefore be beneficially synchronized between or among content players, for example to synchronize subtitle playback on content player 110-2 with video playback on content player 110-1. As another example, content player 110-1 can perform synchronized video and audio playback of a certain title, with the audio playback commencing in one language such as English, while content player 110-2 can perform synchronized audio playback of the same title in another language such as French.

In one embodiment, a particular content player 110-1 is arbitrarily designated as a primary content player and a different content player 110-2 is arbitrarily designated as a secondary content player. A user operates the primary content player to select a title and to manage certain aspects of playback for the digital content associated with the title. For example the primary content player may be used to determine when the title should be played, paused, and so forth. The primary content player generates a primary viewing experience, such as playing video and audio associated with the selected title on a large television screen being viewed by two or more users in a living room. The primary content player performs playback of the selected title according to the corresponding local time signal. Because each content player performs playback for the selected title according to their synchronized local time signals, two or more content players 110 may each perform synchronized playback of the selected title. Importantly, each content player 110 may perform synchronized playback of the selected title with a unique set of viewing options selected.

Figure 2:
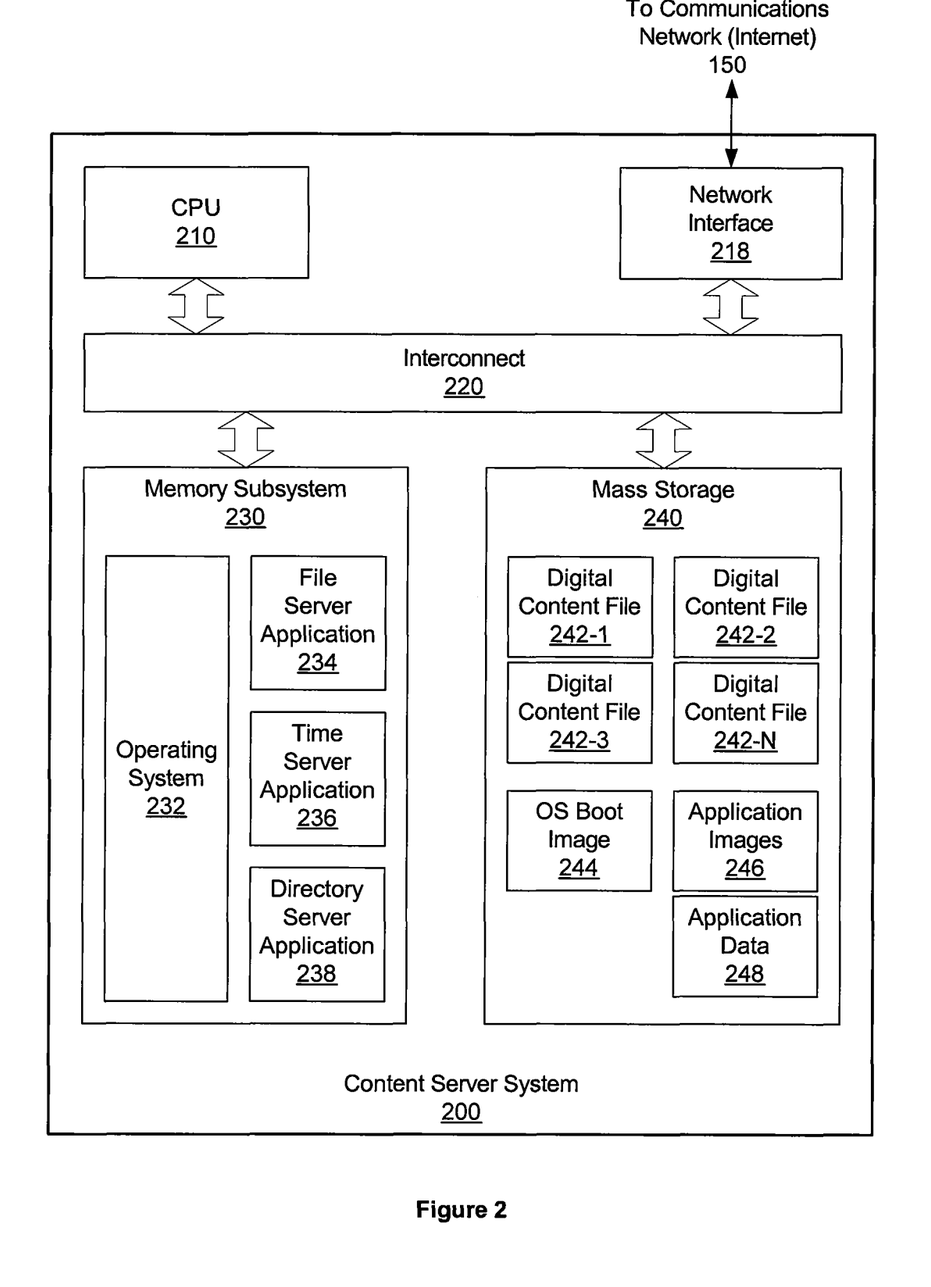
FIG. 2 is a more detailed view of a content server system, according to one embodiment of the present invention.

FIG. 2 is a more detailed view of a content server system 200, according to one embodiment of the present invention. The content server system 200 implements the core functions of the content server 105 of FIG. 1. The content server system 200 includes, without limitation, a central processing unit (CPU) 210, a network interface 218, an interconnect 220, a memory subsystem 230, and a mass storage system 240.

The CPU 210 is configured to retrieve and execute programming instructions stored in a memory subsystem 230. The CPU 210 retrieves the programming instructions from the memory subsystem 230 via interconnect 220. The interconnect 220 is configured to facilitate transmission of data, such as the programming instructions and application data, between the CPU 210 and other subsystems within the content server system 200. The other subsystems include, without limitation, network interface 218, the memory subsystem 230, and the mass storage system 240.

The mass storage system 240 is configured to store non-volatile data. The mass storage system 240 may be implemented using a single storage device, an array of storage devices, or a collection of independent storage devices or arrays of storage devices. Each storage device may comprise at least one magnetic hard disk drive, flash drive, or any other technically feasible non-volatile storage module. The non-volatile data may include, without limitation, an operating system boot image 244, applications 246, application data 248, and locally stored digital content files 242. The mass storage system 240 is coupled to the CPU 210 via interconnect 220.

The network interface 218 is configured to transmit and receive packets of data via the communications network 150. In one embodiment, the network interface 218 is configured to communicate using the well-known Ethernet standard. The network interface 218 is coupled to the CPU 210 via interconnect 220.

The memory subsystem 230 stores programming instructions and data for an operating system 232 and applications 234-238. The operating system 232 is loaded for execution within the memory subsystem 230 from the operating system (OS) boot image 244. The applications 234-238 are loaded for execution from application images 246. The operating system 232 performs system management functions, such as functions to manage hardware devices, including the network interface 218 and mass storage system 240. The operating system 232 also provides a run time model for the applications 234-238. Persons skilled in the art will recognize that various operating systems and run time models that are known in the art are suitable for incorporation into the content server system 200, or may serve as exemplary models for the operating system 232.

File server application 234 is configured to perform file download functions as described previously for file servers 130 of FIG. 1. Time server application 236 is configured to perform time server functions as previously described for time server 132. Directory server application 238 is configured to perform directory server functions as previously described for directory server 134. Persons skilled in the art will recognize that any one or a collection of one or more instances of applications 234 through 238 may be configured to execute on an arbitrary collection of one or more hardware or virtual computer systems. Furthermore, the computer systems may be geographically distributed, for example, to reduce long haul bandwidth requirements between a file server 130 and a content player 110. A content delivery network (CDN) may be implemented and configured to include a plurality of file server 130 instances that are able to provide scalable download bandwidth capacity to meet varying download demand requirements.

Figure 3:
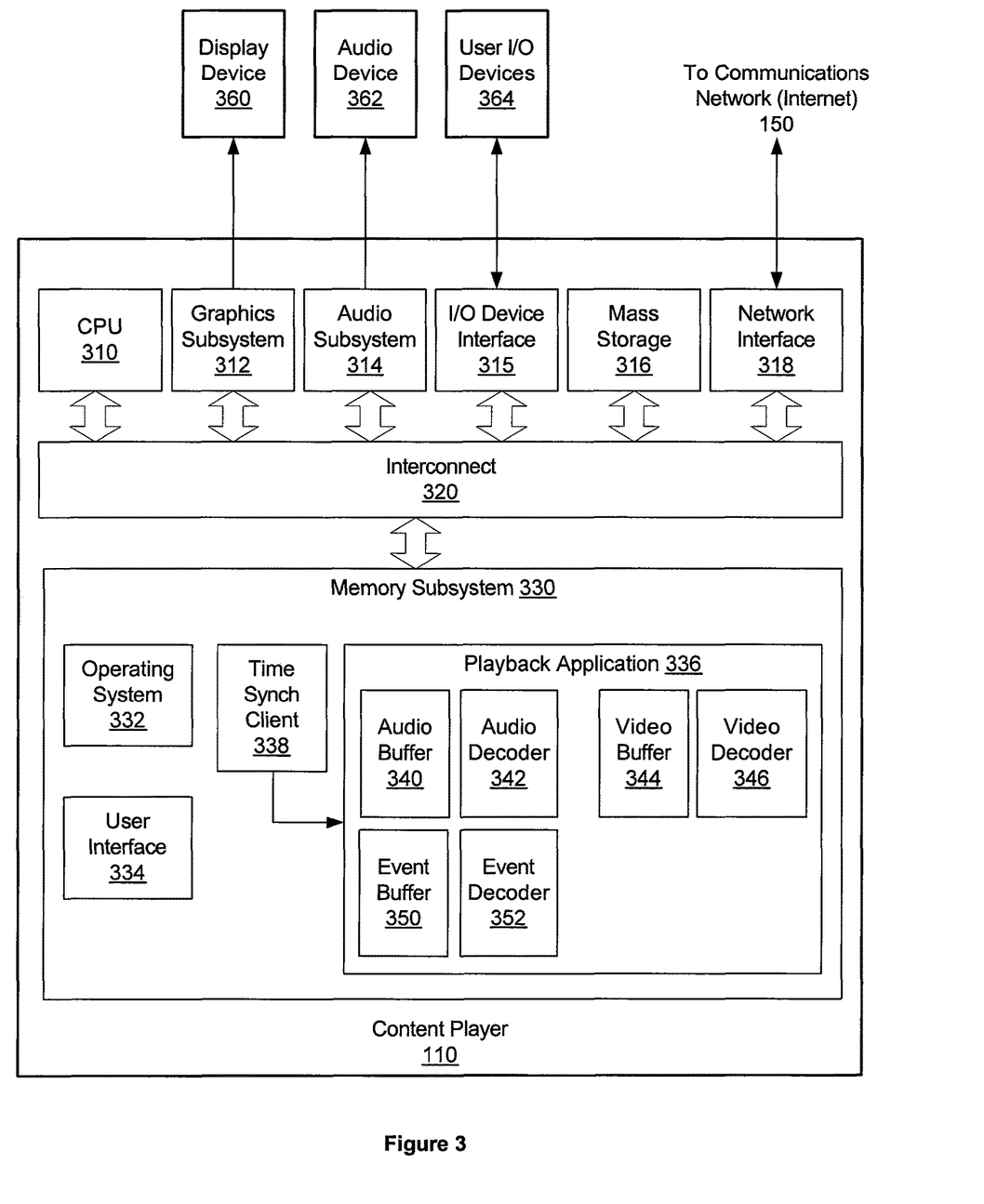
FIG. 3 is a more detailed view of the content player of FIG. 1, according to one embodiment of the present invention.

FIG. 3 is a more detailed view of the content player 110 of FIG. 1, according to one embodiment of the present invention. The content player 110 includes, without limitation, a central processing unit (CPU) 310, a graphics subsystem 312, an audio subsystem 314, an input/output (I/O) device interface 315, a network interface 318, an interconnect 320, and a memory subsystem 330. The content player 110 may also include a mass storage unit 316.

The CPU 310 is configured to retrieve and execute programming instructions stored in a memory subsystem 330. The CPU 310 retrieves the programming instructions from the memory subsystem 330 via interconnect 320, which is configured to facilitate transmission of data, such as the programming instructions and application data, between the CPU 310 and other subsystems. The other subsystems include, without limitation, graphics subsystem 312, audio subsystem 314, I/O devices interface 315, mass storage unit 316, network interface 318, and the memory subsystem 330.

The graphics subsystem 312 is configured to generate frames of video data, such as a sequence of graphics images, and to transmit the frames of video data to display device 360. The graphics subsystem 312 is coupled to the CPU 310 via interconnect 320. In one embodiment, the graphics subsystem 312 is embedded into an integrated circuit, along with the CPU 310. The display device 360 may comprise any technically feasible means for generating an image for display. For example, the display device 360 may utilize liquid crystal display (LCD) technology, cathode-ray technology, and light-emitting diode (LED) display technology (either organic or inorganic) to produce a visual representation of the frames of video data.

The audio subsystem 314 is configured to generate one or more electrical audio signals corresponding to a digital audio stream. For example, the audio subsystem 314 may receive a sequence of binary digital values comprising the digital audio stream and generate one or more analog electrical audio signals that correspond to the binary digital values. The audio device 362 includes a speaker or earphone configured to generate an acoustic output in response to the electrical audio signals. In alternative embodiments, the display device 360 may include the audio device 362 within in a single unit. A television is an example of a device known in the art that incorporates both a display device such as display device 360, and an audio device, such as audio device 362.

The input/output (I/O) device interface 315 is configured to receive input data from user I/O devices 364 and transmit the input data to the CPU 310 via the interconnect 320. For example, user I/O devices 364 may include one or more buttons, a keyboard, and a mouse, a touch screen, or any other pointing device. The user I/O devices 364 may also include indicator devices such as light emitting diodes, liquid crystal display indicators, and the like.

The mass storage unit 316 is configured to store non-volatile data. The mass storage unit 316 may be implemented using a single storage device or an array of storage devices. Each storage device may comprise a magnetic hard disk drive, a flash drive, or any other technically feasible non-volatile storage device. The non-volatile data may include, without limitation, a boot image of an operating system, applications, application data, and locally stored digital content files. The mass storage unit 316 is coupled to the CPU 310 via interconnect 320. The network interface 318 is configured to transmit and receive packets of data via the communications network 150. In one embodiment, the network interface 318 is configured to communicate using the well-known Ethernet standard. The network interface 318 is coupled to the CPU 310 via interconnect 320.

The memory subsystem 330 includes programming instructions and data that comprise an operating system 332 and applications, such as playback application 336. The operating system 332 performs system management functions, such as functions to manage hardware devices including the network interface 318, mass storage unit 316, I/O device interface 315, audio subsystem 314, and graphics subsystem 312. The operating system 332 also provides a run time model for a user interface 334, playback application 336, and a time synchronization client 338. The user interface 334 provides a specific structure, such as a window and object metaphor, for user interaction with content player 110. Persons skilled in the art will recognize the various operating systems and run time models known in the art are suitable for incorporation into the content player 110, or may serve as exemplary models for operating system 332.

The playback application 336 is configured to retrieve digital content files, such as digital content files 242 of FIG. 2, from one or more file servers 130 via the network interface 318 and to play the digital content files to display device 360 and audio device 362. The playback application 336 requests title and catalog information from the directory server 134 and presents the information to the user via the user interface 334. The user is able to interact with the user interface 334 to select one or more titles for playback. In one embodiment, the user interface 334 is configured to generate a graphical user interface on display device 360. The user operates user I/O devices 364, in conjunction with the user interface 334, to select the one or more titles for playback. The playback application 336 then retrieves digital content files associated with the selected titles for playback. The playback application 336 is able to select a particular file server 130, from a list of one or more files servers 130 provided by the directory server 134, for download of each digital content file related to the one or more selected titles. The digital content files are downloaded, decoded, and played to the display device 360 via graphics subsystem 312 and the audio device 362 via audio subsystem 314.

The playback application 336 downloads and stores data for the one or more digital content files in one or more elasticity buffers that are able to buffer network jitter. Buffering network jitter serves to avoid playback jitter, which can reduce playback quality. In one embodiment, audio buffer 340, video buffer 344, and event buffer 350 are configured to act as elasticity buffers for their respective types of data. The audio buffer 340, video buffer 344, and event buffer 350 may be structured as independent buffers. Alternatively, two or more of the audio buffer 340, video buffer 344, and event buffer 350 are combined into a single unified buffer structure.

The audio buffer 340 stores encoded digital audio data and transmits the data to audio decoder 342, which decodes the data to generate a decoded digital audio stream. The encoded digital audio data may be compressed, encrypted, and otherwise formatted for transport. The decoded digital audio stream comprises digital values representing audio magnitude values. The decoded digital audio stream is transmitted to the audio subsystem 314, which generates the electrical audio output signals used to drive the audio device 362. The audio magnitude values, taken in sequence, define a desired acoustic output signal to be generated by the audio device 362. In one embodiment, the encoded digital audio data also includes error correction codes.

The video buffer 344 stores encoded digital video data and transmits the data to video decoder 346, which decodes the data to generate a decoded digital video stream. The encoded digital video data may be compressed, encrypted, and otherwise formatted for transport. The decoded digital video stream comprises a sequence of two-dimensional digital video frames. In one embodiment, the video decoder 346 utilizes hardware resources from the graphics subsystem 312 to assist in decoding the encoded digital video data. The digital video frames, taken in sequence, define a desired video sequence to be displayed by display device 360. The graphics subsystem 312 receives the decoded digital video stream and, in response, generates a video signal suitable to drive the display device. The video signal may conform to an arbitrary standard, such as component video, RGB video, HDMI video, and the like. In one embodiment, the encoded digital video data also includes error correction codes. In certain embodiments, the digital video data comprises stereoscopic images that produce a three-dimensional appearance when viewed on an appropriate display device through stereoscopic glasses, such as polarizing glasses. In certain alternative embodiments, the digital video data comprises three-dimensional content that may be rendered, animated, or otherwise executed synchronously according to the teachings of the present invention.

The event buffer 350 stores event data related to events that may be generated during content playback of alter a normal flow of content playback. For example, the event buffer 350 may store subtitle data used to generate video overlays of subtitle text to be displayed during playback. The event decoder 352 decodes the event data and generates actions based on the event data. The event decoder may generate the video overlays via computations performed on the CPU 310 or via computations performed by the graphics subsystem 312. In one embodiment, the event decoder 352 also decodes events related to playback for a selected title, such as commands to play, pause, or otherwise alter a current playback operation. For example, if the event decoder 352 receives a pause command, then the event decoder 352 signals the playback application 336 to pause at a certain time indicated by a time stamp associated with the pause command.

The time synchronization client 338 is configured to generate a local time signal that is synchronized to the time reference signal generated by the time server 132. As described previously, each local time signal generated by each content player 110 within the content distribution system 100 is nominally synchronized with each other local time signal generated by a different, arbitrary content player 110.

The data stored within the audio buffer 340, video buffer 344, and event buffer 350 are marked with time codes. The time codes are used, without limitation, to synchronize video and audio playback, and to synchronize video and subtitle playback. The time codes are interpreted with respect to the local time signal generated by the time synchronization client 338. In one embodiment, certain time codes within each digital content file are formatted relative to elapsed time for the title. Certain other time codes are formatted relative to the time reference signal, which is available within each content player 110 as the local time signal. A start time for the title is maintained relative to the local time signal, and elapsed time for the title is accounted for relative to the local time signal. Playback, including pauses, fast forwarding, or reversing playback are tracked to maintain a relationship between elapsed time and the local time signal.

In one embodiment, a mechanism known in the art as a "server side event" is used to trigger actions within the content players 110. A server side event may occur at any time, and a conventional implementation of the server side event mechanism does not require the content player 110 to poll an associated server configured to generate server side events. Instead, the server transmits an event to the content player 110, which can then respond appropriately to the event.

For example, if content player 110-1 is controlling playback (is the primary content player) and a pause is issued by a user operating content player 110-1, then the content player 110-1 transmits a pause request command to the content server system 200, which, in turn transmits a pause command, formatted as a server side event with a time stamp to each content player 110 participating in a playback session with content player 110-1. The time stamp indicates, relative to each respective local time signal, when the pause in playback should occur for the participating content players 110. The time stamp may be scheduled, for example, several hundred milliseconds after the pause is requested. Upon receipt of the server side event scheduling an imminent pause command, each participating content player 110 pauses synchronously with each other content player 110, based on the time stamp value embedded in the pause command.

In another example, a user indicates to content player 110-1 that playback should begin. In response, content player 110-1 transmits a play command to the content server system 200, which initiates playback by transmitting a time stamped play command, formatted as a server side event, to each participating content player 110. The participating content players 110 can then begin playback simultaneously based on a time stamp embedded in the play command. In common scenarios, the content players 110 buffers well ahead of the start of playback. However, buffering ahead does not impact a synchronous start of playback among participating content players 110. In one embodiment, the audio buffer 340 and video buffer 344 are allowed to buffer content arbitrarily ahead of playback, and are allowed to continue buffering, even when playback is halted. The event buffer 350 is used to buffer incoming server side events, and related actions are scheduled as quickly as possible. A schedule of actions is maintained, and later arriving server side events may include actions that need to supersede events already scheduled.

A given model of content player 110 is configured to have certain playback capabilities. For example, a particular model of content player 110 may have a certain range of possible display resolutions and video decoder options, a certain selection of audio decoders, certain digital rights management functions, and the like. To facilitate proper playback of a particular title, each content player 110 advertises a model type or capability set to the content server 105. Any technically feasible technique may be used to advertise model type or capability set. In response, the content server 105 selects a suitable set of digital content files associated with the selected title for download to the content player 110. For example, if the content player 110 has a horizontal screen resolution of 1024 pixels, a digital content file 242 encoded to for a horizontal screen resolution of 1024 pixels may be selected for download to the content player 110.

Independent of each content player model or capability set, each content player 110 may have access to a different level of bandwidth capacity through communications network 150. As such, one content player 110 with a low bandwidth capacity may need to download a digital content file encoded to a lower bit rate than an identical content player 110 with access to a much higher bandwidth capacity.

Figure 4:
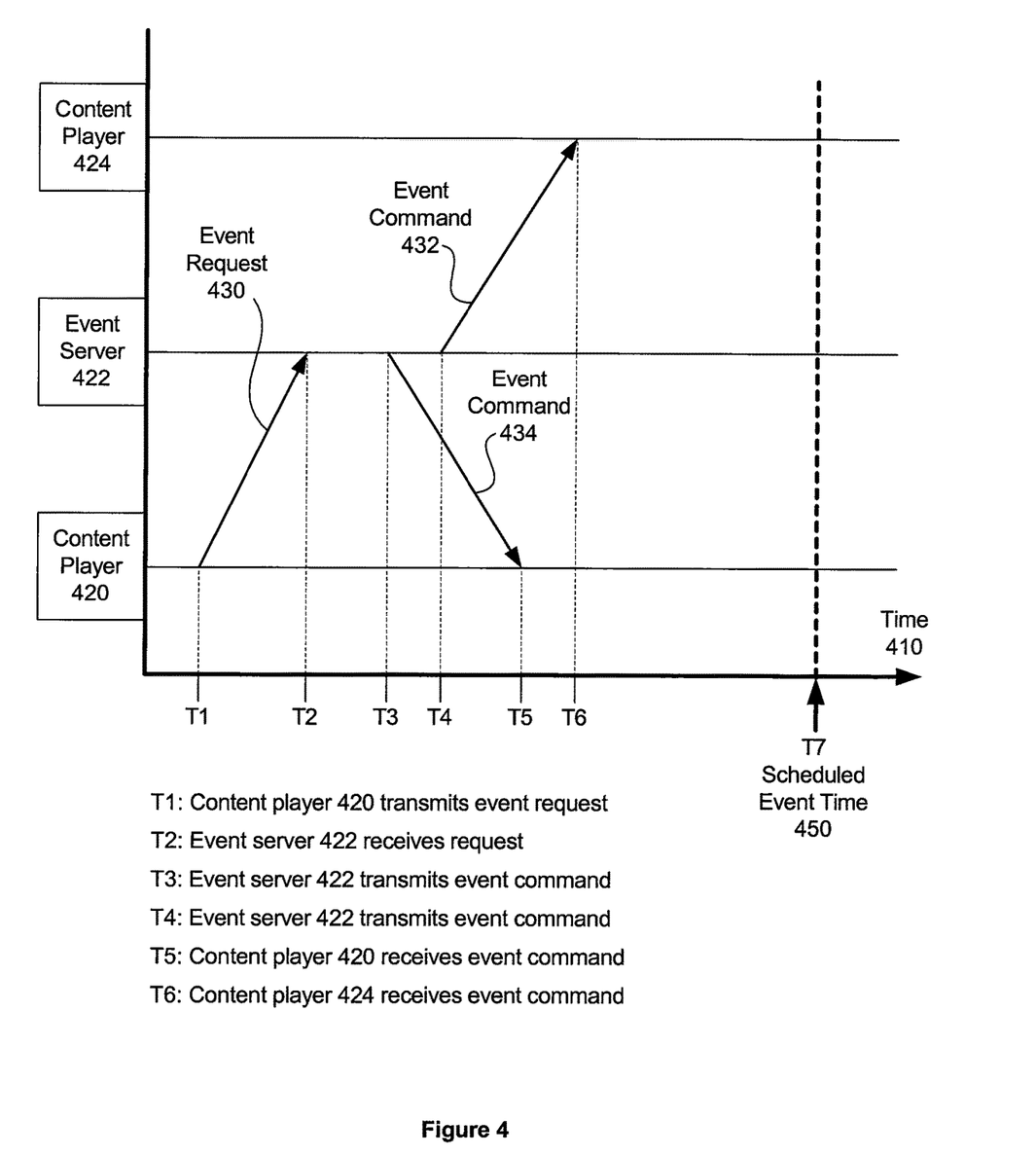
FIG. 4 depicts a synchronized playback event, according to one embodiment of the present invention.

FIG. 4 depicts a synchronized playback event, according to one embodiment of the present invention. As shown, timing markers (T1, T2, and so forth) are referenced to time 410, which corresponds directly to the time reference signal and, therefore, to each synchronized local time signal. The playback event, in this case a user-initiated event such as "play" or "pause," is requested by content player 420. Content server 420 is an arbitrary content player 110 of FIG. 1. The playback event is transmitted as an event request 430 at time T1 to an event server 422. The event request 430 bundles a specific playback command, such as play, pause, and the like, with a scheduled event time 450 for the playback command to be executed on each participating content player 420, 424. In one embodiment, the event server 422 is a server associated with the content server 105 of FIG. 1. For example, a particular file server 130 that is scheduled to download a selected title for playback may act as the event server 422 for one or more related playback sessions. In an alternative embodiment, the event server 422 may be implemented as a separate and distinct server machine.

The event server 422 receives the event request 430 at time T2. The difference in time between T2 and T1 approximately represents network latency through communications network 150 for data transmitted from content player 420 to event server 422. In response to the event request 430, the event server 422 transmits event command 432 at time T3 and event command 434 at time T4. Event commands 432, 434 include both the specific playback command and scheduled event time 450. Content player 420 receives event command 434 at time T5, which is well in advance of T7, the scheduled event time 450. Content player 424 receives event command 432 at time T6, which is also well in advance of T7. The difference in time between T5 and T3 approximately represents network latency through communications network 150 for data transmitted from event server 422 to content player 420. Similarly, the difference between T6 and T4 represents network latency for data transmitted from event server 422 to content player 420. Each latency (T6-T4 and T5-T3) may be different and therefore T7 should be scheduled after whichever latency is longest. Because content players 420 and 422 both maintain a synchronized local time signal, the event commands 432, 434 will both execute at the T7, the scheduled event time 450 for the event commands.

In addition to user-initiated events, as described above, other events related to playback of a title may also be scheduled and executed by content players 420, 424. For example, playback of sequential video, audio, and subtitle segments may be scheduled for synchronized playback on content players 420, 424. In one embodiment, a start time for a particular digital content file is determined with respect to the time reference signal, while playback of the digital content is based on relative time stamps within the digital content file. To maintain a synchronized playback experience, actions such as starting or stopping playback, or conducting playback at different speeds are accounted for relative to the time reference signal.

Persons skilled in the art will recognize that synchronized playback described above with respect to two content players 420, 424 can be easily generalized to include an arbitrarily large number of content players without departing the scope of the present invention.

Figure 5:
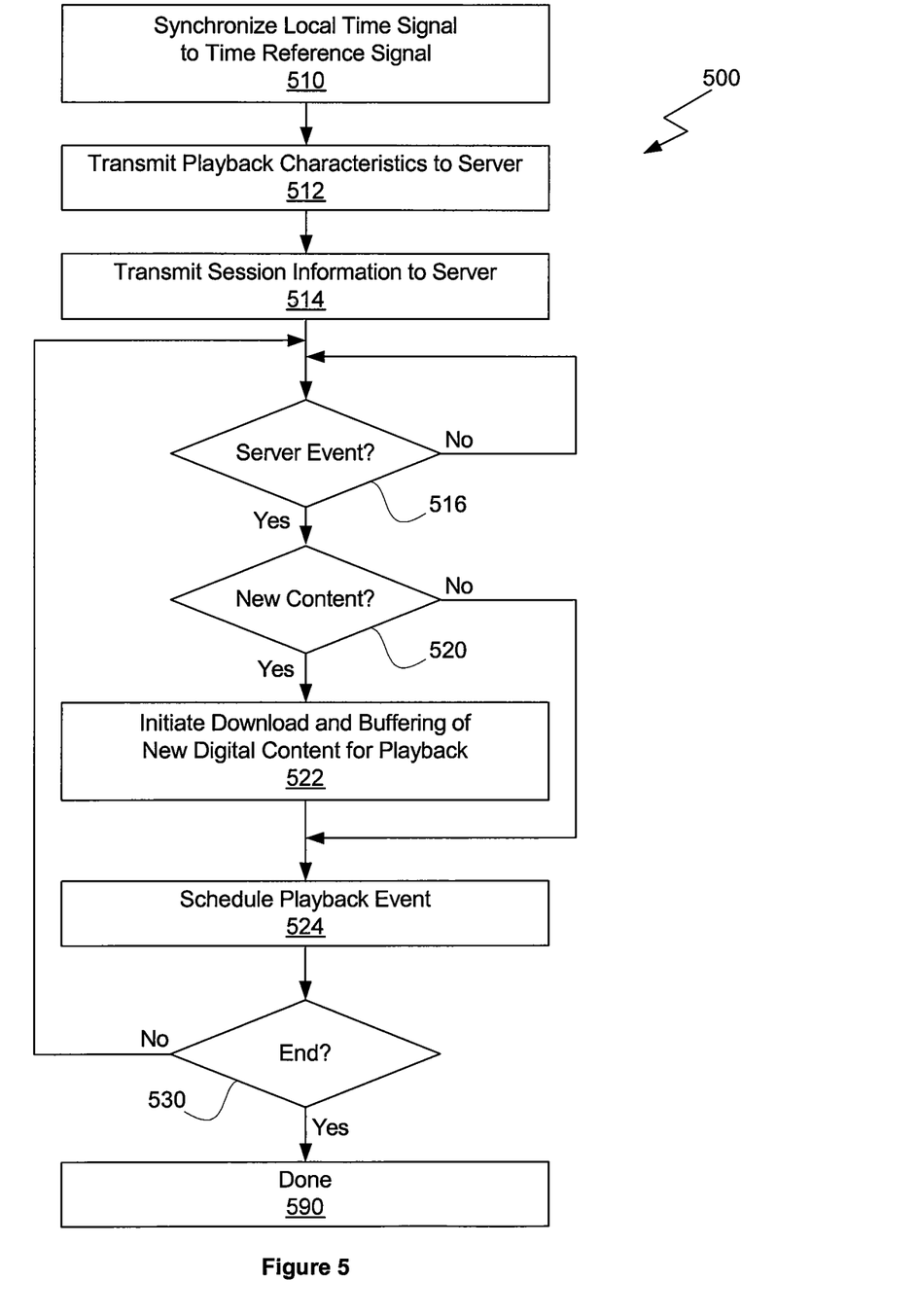
FIG. 5 is a flow diagram of method steps for performing synchronized playback, according to one embodiment of the present invention.

FIG. 5 is a flow diagram of method steps 500 for performing synchronized playback, according to one embodiment of the present invention. Although the method steps are described in conjunction with the systems of FIGS. 1-3, persons skilled in the art will understand that any system configured to perform the method steps, in any order, is within the scope of the invention.

As described in FIG. 1, content players 110 can be configured to play a particular title synchronously. The title includes one or more associated digital content files 242 of FIG. 2. Digital content files 242 associated with a particular title may differ based on encoding, format, language, resolution, bit rate, or any other technically distinguishing factor. Prior to playback, each one of the content players 110 is directed to an appropriate content file 242 for download and playback, based on individual playback characteristics of the content player 110. The method steps 500 are independently performed by each one of the content players 110, having the beneficial effect of synchronizing playback between and among the content players 110. Importantly, synchronized playback can be performed over a diversity of content players with arbitrary playback characteristics and preferences.

The method begins in step 510, where playback application 336 of FIG. 3 waits for time synchronization client 338 to synchronize the local time signal within the content player 110 to the time reference signal generated by time server 132. Once the local time signal is synchronized to time server 132, synchronized playback may commence on the content player 110.

In step 512, the content player 110 transmits playback characteristics for the content player 110 to content server 105. The playback characteristics may include, without limitation, a product model, available display resolution, supported video and audio formats, preferred audio track language, subtitle preferences. In step 514, the content player 110 transmits session information to the content server 105. The session information binds the content player 110 to a particular synchronized playback session. The session information may be a particular user account name, session identification code, or any other technically feasible session identifier that associates a given content player 110 with the synchronized playback session. The playback session associates a particular title with related server side events governing playback of the title. Each content player 110 performing the method steps 500 may be directed to a different digital content file 242 associated with a particular title, based on playback characteristics for the content player. Server side events governing playback are transmitted to all content players 110 bound to the synchronized playback session.

In one embodiment, the directory server 134 within the content server 105 selects a particular digital content file 242 for each content player 110. In an alternative embodiment, each file server 130 selects a particular digital content file 242 for each content player 110 that has established communication with the file server 130.

In step 516, if a server side event has not been received, then the method proceeds to back to step 516. In one embodiment, step 516 may be implemented as a blocking read executed by the playback application 336. A blocking read causes the playback application 336 to wait for an incoming event that originates from the event server, such as event server 422 of FIG. 4. Otherwise, if a server side event has been received, then the method proceeds to step 520.

In step 520, if new digital content is specified for playback, then the method proceeds to step 522. For example, at the beginning of playback for a given title, one or more segments of data within digital content file 242 may comprise the new digital content for playback. During playback of the title, new content may be specified for synchronized playback, such additional content may include segments of the digital content file 242, advertisement content, or informational material related to the title. In step 522, the playback application 336 initiates a process to download and buffer the new digital content for playback from file server 130.

In step 524, the playback event is scheduled for execution, whereby the execution time is referenced to the synchronized local time signal. Playback of the new digital content commences at the scheduled execution time that is referenced to the local time signal. Playback of digital content and execution of related events are performed by one or more threads that are triggered by a scheduler to execute or play at a specified time. Specifically, the playback application 336 may comprise a plurality of threads, with one or more threads assigned to schedule events and execution, one or more threads assigned to download and buffer the digital content, and one or more threads assigned to play the digital content.

If, in step 530, each different item of digital content has not been played to conclusion, then the method proceeds back to step 516. If, however, the digital content has been played to conclusion, then the method terminates in step 590.

Returning to step 520, if new digital content is not specified for download, then the method proceeds to step 524.

One embodiment of the present invention is implemented as a program product stored on at least one computer-readable storage medium residing within the content player 110. In such an embodiment, the content player 110 comprises a general purpose computing platform such as a personal computer or mobile computing platform such as a "smart phone," or an embedded computer platform such as a set top box. The stored program product enables the method of FIG. 5 to be implemented by the content player 110. In an alternative embodiment, a program product is downloaded to a memory within a computer device. For example, the downloaded program product may be executable instructions embedded within an internet web site. In such an embodiment, the content player 110 comprises the computer device. The downloaded program product enables the methods of FIG. 5 to be implemented by the content player 110.

In sum, a technique for implementing synchronized digital content playback is disclosed. The technique involves a plurality of content players, each synchronizing a corresponding local time signal to a time reference signal. The local time signals are then used as local time references for scheduling and executing events related to playback for the digital content, which may include video, audio, subtitles, and any other related content which may be temporally correlated to the video and audio content. A server side event is transmitted to the plurality of content players, which each respond by downloading, buffering, and scheduling the digital content for playback. The scheduling of digital content playback is with respect to the synchronized local time signals, and therefore, playback of the digital content is synchronized for the plurality of content players.

One advantage of the disclosed systems and methods is that a plurality of users is enabled to share a common viewing experience based on their individual viewing preferences. This is in contrast to prior art solutions that force all users to share one common set of viewing preferences.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

We claim:

1. A method for playing a digital content title synchronously across a plurality of endpoint devices, the method comprising:

transmitting, to a content server, a playback session identifier that uniquely identifies a session of two or more sessions, of which each session facilitates synchronous playback of the digital content title across multiple endpoint devices;

transmitting, from a first endpoint device and to the content server, an event request that includes: (1) a playback command initiated at the first endpoint device at a first time and associated with the digital content title, and (2) a specified time subsequent to the first time when the playback command is to be executed, wherein the specified time is determined by the first endpoint device based on: (1) a first latency associated with transmission of the event request from the first endpoint device to the content server via the communications network, (2) a second latency associated with transmission from the content server back to the first endpoint device via the communications network, and (3) a third latency associated with transmission from the content server to a second endpoint device via the communications network, wherein the first endpoint device and the content server comprise different machines coupled to one another via the communications network, and wherein the second endpoint device and the content server comprise different machines coupled to one another via the communications network;

receiving, by the first endpoint device and from the content server, an event command that includes the playback command and the specified time;

scheduling, by the first endpoint device in response to the event command, the playback command for execution at the specified time based on a local time signal that has been synchronized to a time reference signal;

receiving, by the first endpoint device and from the content server, a second event command that includes a second playback command associated with the digital content title and initiated at the first endpoint device; and scheduling, by the first endpoint device in response to the second event command, the second playback command for execution based on the local time signal and one or more timestamps associated with one or more portions of the digital content title being played in response to the playback command being executed.

2. The method of claim 1, wherein the local time signal is synchronized via a time synchronization protocol established between a local time client generating the local time signal and a remote time server generating the time reference signal.

3. The method of claim 2, wherein the time synchronization protocol comprises an industry standard network time protocol.

4. The method of claim 1, further comprising transmitting one or more playback characteristics of the first endpoint device to the content server.

5. The method of claim 4, wherein the one or more playback characteristics comprises at least one of a product model, an available display resolution, a supported video format, a supported audio format, a subtitle preference, and a preferred audio track language.

6. The method of claim 4, wherein the digital content title includes a plurality of digital content files, and further comprising initiating a download of a first digital content file included in the plurality of digital content files based on the one or more playback characteristics.

7. The method of claim 6, further comprising storing data associated with the first digital content file in a local buffer memory for playback.

8. The method of claim 7, wherein playback of the first digital content file is synchronized to the local time signal.

9. The method of claim 1, further comprising synchronizing the local time signal with the time reference signal.

10. A non-transitory computer-readable medium including instructions that, when executed by a processor included in a first endpoint device, cause the processor to perform the steps of:

transmitting, to a content server, a playback session identifier that uniquely identifies a session of two or more sessions, of which each session facilitates synchronous playback of the digital content title across multiple endpoint devices;

transmitting, from the first endpoint device and to the content server, an event request that includes: (1) a playback command initiated at the first endpoint device at a first time and associated with the digital content title, and (2) a specified time subsequent to the first time when the playback command is to be executed, wherein the specified time is determined by the first endpoint device based on: (1) a first latency associated with transmission of the event request from the first endpoint device to the content server via the communications network, (2) a second latency associated with transmission from the content server back to the first endpoint device via the communications network, and (3) a third latency associated with transmission from the content server to a second endpoint device via the communications network, wherein the first endpoint device and the content server comprise different machines coupled to one another via the communications network, and wherein the second endpoint device and the content server comprise different machines coupled to one another via the communications network;

receiving, by the first endpoint device and from the content server, an event command that includes the playback command and the specified time;

scheduling, by the first endpoint device in response to the event command, the playback command for execution at the specified time based on a local time signal that has been synchronized to a time reference signal;

receiving, by the first endpoint device and from the content server, a second event command that includes a second playback command associated with the digital content title and initiated at the first endpoint device; and scheduling, by the first endpoint device in response to the second event command, the second playback command for execution based on the local time signal and one or more timestamps associated with one or more portions of the digital content title being played in response to the playback command being executed.

11. The non-transitory computer-readable medium of claim 10, wherein the local time signal is synchronized via a time synchronization protocol established between a local time client generating the local time signal and a remote time server generating the time reference signal.

12. The non-transitory computer-readable medium of claim 11, wherein the time synchronization protocol comprises an industry standard network time protocol.

13. The non-transitory computer-readable medium of claim 10, the operation further comprising transmitting one or more playback characteristics of the first endpoint device to the content server.

14. The non-transitory computer-readable medium of claim 13, wherein the one or more playback characteristics comprises at least one of a product model, an available display resolution, a supported video format, a supported audio format, a subtitle preference, and a preferred audio track language.

15. The non-transitory computer-readable medium of claim 13, wherein the digital content title includes a plurality of digital content files, and the operation further comprising initiating a download of a first digital content file included in the plurality of digital content files based on the one or more playback characteristics.

16. The non-transitory computer-readable medium of claim 15, the operation further comprising storing data associated with the first digital content file in a local buffer memory for playback.

17. The non-transitory computer-readable medium of claim 16, wherein playback of the first digital content file is synchronized to the local time signal.

18. A computer device, comprising:
a memory storing instructions; and
a processor that is coupled to the memory and, when executing the instructions, is configured to:
synchronize a local time signal to a time reference signal generated,
transmit, to a content server, a playback session identifier that uniquely identifies a session of two or more sessions, of which each session facilitates synchronous playback of the digital content title across multiple endpoint devices, wherein the computer device and the content server comprise different machines coupled to one another via a communications network;
transmit, to the content server, an event request that includes: (1) a playback command initiated at the computer device at a first time and associated with the digital content title, and (2) a specified time subsequent to the first time when the playback command is to be executed, wherein the specified time is determined by the computer device based on: (1) a first latency associated with transmission of the event request from the computer device to the content server via the communications network, (2) a second latency associated with transmission from the content server back to the computer device via the communications network, and (3) a third latency associated with transmission from the content server to a second computer device via the communications network, wherein the second computer device and the content server comprise different machines coupled to one another via the communications network;
receive, from the content server, an event command that includes the playback command and the specified time;
schedule, in response to the event command, the playback command for execution at the specified time based on the local time signal that has been synchronized;
receive, from the content server, a second event command that includes a second playback command associated with the digital content title; and
schedule, in response to the second event command, the second playback command for execution based on the local time signal and one or more timestamps associated with one or more portions of the digital content title being played in response to the playback command being executed.

19. The computer device of claim 18, wherein the processor is further configured to transmit one or more playback characteristics to the content server.

20. The computer device of claim 19, wherein the digital content title includes a plurality of digital content files, and the processor is further configured to initiate a download of a first digital content file included in the plurality of digital content files based on the one or more playback characteristics.

21. The method of claim 1, wherein, in response to the event request transmitted by the first endpoint device, a third event command is received by the second endpoint device from the content server, the second endpoint device, the first endpoint device, and the content server comprising different machines coupled to one another via the communications network, the third event command also including the playback command and the specified time for executing the playback command, and wherein the third event command causes the second computing device to schedule the playback command for execution at the specified time.

22. The method of claim 21, wherein the content server comprises a geographically distributed content delivery network to reduce long haul bandwidth requirements between the content server and the first endpoint device and between the content server and the second endpoint device.

* * * * *